Figure 1:
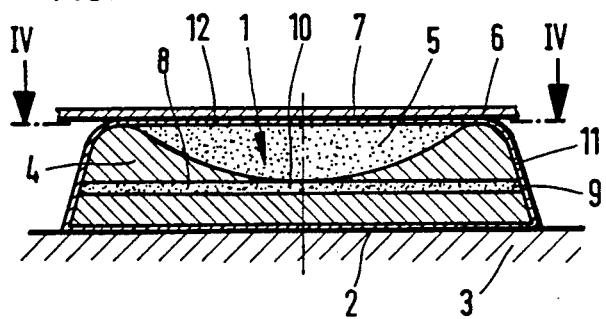

United States Patent [19]

Polus

[11] Patent Number: 5,054,753
[45] Date of Patent: Oct. 8, 1991

[54] DAMPING DEVICE FOR SHOCK LOADING

[76] Inventor: Michael Polus, Welserstrasse 65,, D-8500 Nürnberg 20,, Fed. Rep. of Germany

[21] Appl. No.: 459,768
[22] PCT Filed: May 11, 1989
[86] PCT No.: PCT/DE89/00299
  § 371 Date: Jan. 12, 1990
  § 102(e) Date: Jan. 12, 1990
[87] PCT Pub. No.: WO89/11047
  PCT Pub. Date: Nov. 16, 1989

[30] Foreign Application Priority Data
  Mar. 1, 1989 [DE] Fed. Rep. of Germany ....... 3906466
  May 13, 1989 [DE] Fed. Rep. of Germany ....... 3816400

[51] Int. Cl.$^5$ .................. A43B 21/26; B60N 1/06; F16F 13/00
[52] U.S. Cl. .................. 267/153; 36/35 R; 267/140.1; 267/141
[58] Field of Search ............ 267/140.1, 152, 153, 267/142–146, 141, 82, 219, 113, 118, 121, 122, 131, 133, 140; 297/216, 391, 395, 460; 5/455, 449; 248/631, 633, 562, 636; 36/35 R, 35 B, 27–29; 188/298

[56] References Cited

U.S. PATENT DOCUMENTS

| | | | |
|---|---|---|---|
| 2,129,941 | 9/1938 | King et al. .................. | 267/152 |
| 2,535,080 | 12/1950 | Lee . | |
| 3,134,585 | 5/1964 | Trask .................. | 267/153 |
| 3,612,506 | 10/1971 | Malherbe .................. | 267/152 |
| 3,680,912 | 8/1972 | Matsuura . | |
| 3,698,703 | 10/1972 | Hipsher .................. | 267/219 |
| 3,920,231 | 11/1975 | Harrison et al. .................. | 267/219 X |
| 4,389,045 | 6/1983 | Taylor .................. | 267/152 X |
| 4,458,888 | 7/1984 | Wolf et al. .................. | 267/153 X |
| 4,856,626 | 8/1989 | Nakanishi .................. | 267/152 X |
| 4,871,150 | 10/1989 | LeSalver et al. .................. | 267/153 X |

FOREIGN PATENT DOCUMENTS

| | | |
|---|---|---|
| 0012638 | 6/1980 | European Pat. Off. . |
| 0219786 | 4/1987 | European Pat. Off. . |
| 0253373 | 1/1988 | European Pat. Off. . |
| 1203578 | 5/1966 | Fed. Rep. of Germany . |
| 2948408 | 6/1981 | Fed. Rep. of Germany . |
| 2242605 | 3/1975 | France . |
| 2517526 | 6/1983 | France . |
| 2105438 | 3/1983 | United Kingdom . |

OTHER PUBLICATIONS

LV, 55979 (M.B.P. Int.) Jul. 26, 1968.
Patent Abstracts of Japan, Band 8, Nr. 69 (M–286)(1506) Mar. 31, 1984 and JP, A, 58217837, Dec. 17, 1983.
Patent Abstracts of Japan, Band 7, Nr. 141 (M–223)(1286), June. 21, 1983 and JP, A, 5854249 (Toyoda) Mar 31, 1983.
Patent Abstracts of Japan, Band 11, Nr. 333, (M–637)(2780) Toyo Tire, May 25, 1987.

Primary Examiner—Douglas C. Butler
Attorney, Agent, or Firm—Toren, McGeady & Associates

[57] ABSTRACT

An energy-absorbing damping device comprises a basic body which delimits a liquid-filled chamber, the basic body being provided with channels opening onto the outside of the basic body, the channels ensuring communication with a medium which deforms elastically under the pressure of the liquid. To enhance the cost-effectiveness of the damping device, the channels are designed as narrow, flow-restricting channels and the elastically deformable medium is an elastically extensible diaphragm sealed around it periphery and covering the external openings of the flow-restricting channels. The energy of an impact or a blow is absorbed by the liquid being forced through the narrow flow-restricting channels and by extension of the elastic diaphragm.

8 Claims, 4 Drawing Sheets

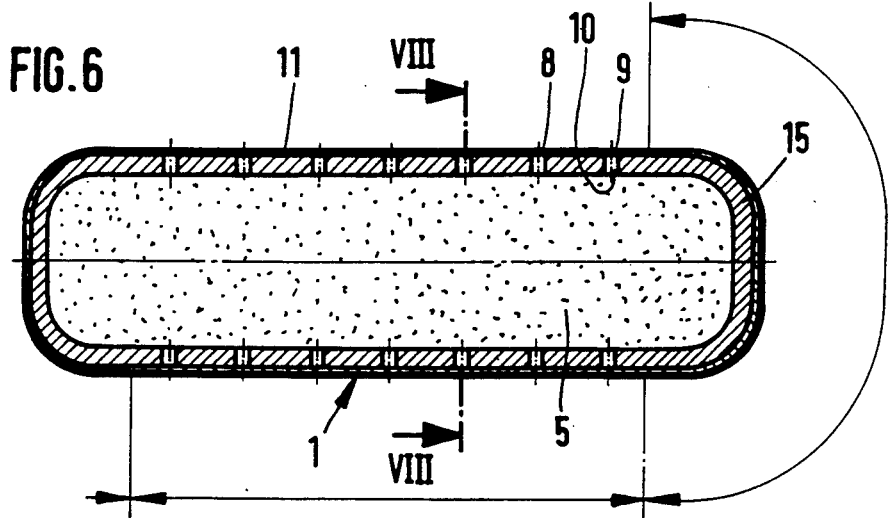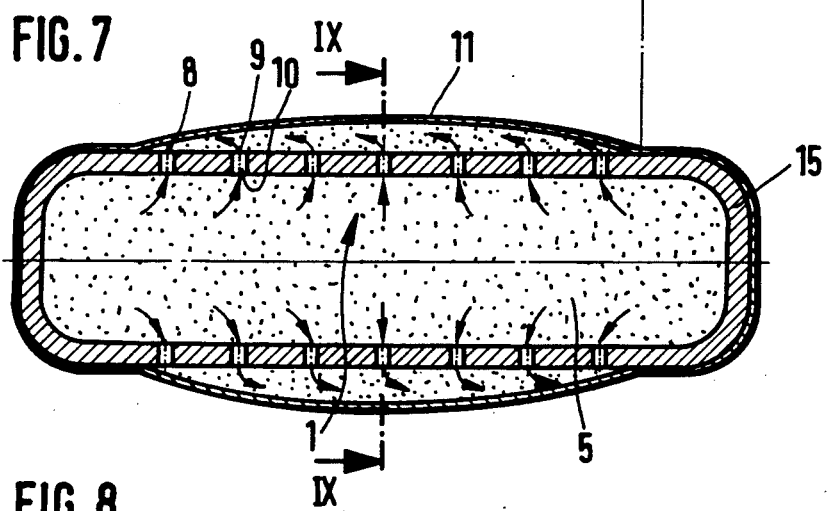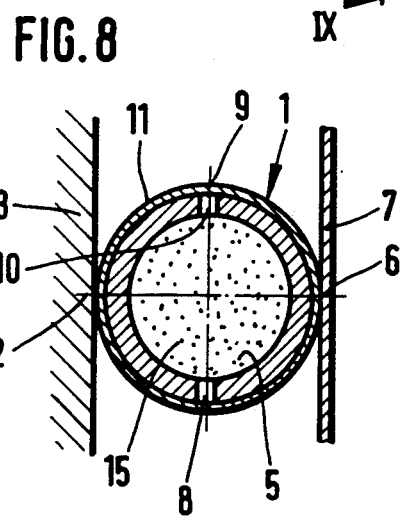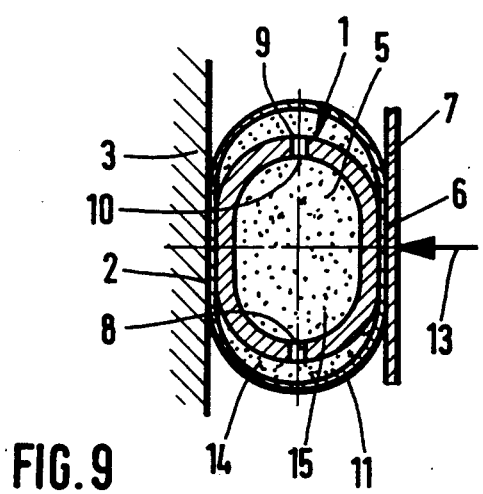

DAMPING DEVICE FOR SHOCK LOADING

The invention is directed to an energy-absorbing damping device for shock loads, where a basic body consists of elastically deformable material, is elastically compressible and defines a chamber filled with liquid, and where channels devoid of valves provided in the basic body emanate from the chamber, form respectively an external outlet at the outer side of the basic body and constitute a connection to a medium yielding elastically when subjected to liquid pressure, where hydraulic flow restrictors are provided between the chamber and the elastically yielding medium and where the basic body constitutes a backup face and a load carrying face, lying opposite each other, wherein the channels extend essentially in direction of these faces or surfaces.

In a known damping device of this type (DE-PS 12 03 578) the channels, being connecting channels, are designed to be wide. The connecting channels transit with their external outlets into a pipeline connected with gas cushions, which are elastically compressed when the basic body is subjected to a load. The liquid which has entered into the gas cushions through check valves flows back into the pipeline through restrictor valves. This damping device is costly because of the pipeline, the gas cushion and the valves.

One task of the invention consists in creating a damping device of the previously mentioned type which is less costly. In solving this task, the damping device in the invention is characterized by the channels designed to be narrow as flow restrictor channels and by the elastically yielding medium being an elastically extensible diaphragm, which is fixed so as to be sealed all around its periphery and which covers the external outlets of the flow restrictor channels.

In the course of the energy absorption the energy of the shock or blow presses the liquid through the narrow flow restrictor channels and extends the elastic diaphragm. The damping device does not require much space and is simplified, since instead of many additional parts such as annular pipeline, gas cushion and valves, only the extensible diaphragm is provided. The damping occurs under successive energy build down and without vibrations. The dampening effect at first not strong as an impulse, rather it increases gradually.

In the damping device in the invention we are dealing with an elastic, hydraulic energy absorption system out of which liquid is pressed from the elastic chamber, which assumes a shape depending upon the load, through the flow restrictor channels. The pressed-out liquid collects in the diaphragm and is returned in the normal working sequence into the chamber which had been upset by the shock or blow. The parameters: elasticity, volume and flow restrictors produce an accurately defined output. The peak loads caused by inertia occurring in rigid systems are avoided in this case. The damping device can be used as a damped vibrating system, if subjected to a constant static load.

The diaphragm or foil consists for instance of elastic plastics material or synthetic rubber. The basic body consists for instance of closed cell polyurethane, silicone rubber or sponge rubber The diameter of the flow restriction channel depends upon the respective us of the damping device and the desired damping sequence. The basic body is as a rule made in one piece. The formation in the invention is circular, oval or rectangular, if viewed in one plane.

It is especially appropriate and advantageous to provide two flow restriction channels A larger number, for instance more than three flow restriction channels, improve the effectiveness of the damping device.

The damping device in the invention is tuned to a gradually increasing damping sequence free from a high initial vibration. It is particularly expedient and advantageous if the basic body, the flow restriction channels and the diaphragm are tuned to a damping characteristic similar to a parabola. Such a damping characteristic, meaning such a force measured as a function of time at the backup face in case of blow-like loads on the load carrying face is preferred in many application cases.

An especially expedient and advantageous embodiment is obtained if the basic body is an elongated cylindrical structure and the end faces of the cylindrical structures are closed and the flow restriction channels are provided in the cylinder jacket. The backup and load application faces are elongated. The restoring motion of this damping device, meaning the return flow of the liquid from the bulge of the diaphragm into the chamber occurs slowly through the flow restriction channels. The cylinder jacket affords space for the membrane to assume a large area bulge.

An additional particularly expedient and advantageous embodiment version is present if the chamber is limited by a cavity in the basic body and a region of the diaphragm spanning the cavity, which region of the diaphragm extends over the bead or torus forming the cavity up to and over the external outlets of the flow restriction channels In this embodiment the liquid flows upon termination of the blow from the bulge of the membrane located at the flow restriction channel external outlets rapidly through the bead back into the chamber.

In an embodiment version of the invention the flow restriction channels are arranged entirely in the basic body and enclosed by it on all sides, wherein the flow restriction channels are spaced from the backup face as well as from the load application face. A version in the invention however exists, where the chamber is limited by a cavity, provided at backup- or the load application chamber of the basic body, if the flow restriction channels are provided to be open on one side at the load- or backup faces of the basic body forming the cavity and are covered by a cover formation and if the flow restriction channels are bounded on the sides by the ridges formed by the basic body, whose cross-section diminishes towards their free end.

In this version of the invention the basic body is squeezed less under a shock and its diameter is increased by a smaller amount. The friction of the diaphragm against the basic body in the course of the shape changes caused by loading and unloading is diminished. It is all the same whether the face provided with the cavity and the ridges or the ledges is the load application face or the backup face or whether the ridges are arranged to face upwards or downwards. The material of the basic body can be less soft and less compressible so that flexing or squeezing and instability are reduced or practically eliminated. The ridges are compressed if subjected to shock or blow and the extent and the sequence of the energy absorption can be better computed and adjusted by the dimensioning of the ridges. Since the basic body is as a rule round or oval viewed in one plane, the ridges generally extend radially.

It is particularly expedient and advantageous if in the case of the ridges, whose cross-section tapers towards their free end, that the one ridge flank has a shallower incline than the other. These ridges fold toward the side of the steeper flank when subjected to shock or flow, whereby the energy absorption can be better adjusted. The effect of the foldover can be influenced by adjusting the steeper and the shallower flank.

Furthermore it is especially expedient and advantageous if the ridges are located at an essentially flat trunk face of the basic body and the height of the ridges pointing away from the trunk surface increases towards the outer edge of the trunk surface with formation of the concave cavity. Herein the flow restriction channels are to begin with closed by the covering formation only in the region of the greatest ridge height and said flow restriction channels develop their throttling action only in the closed region. With the increasing impression caused by the shock the channel closing extends also across lower ridge heights, whereby the length of the flow restriction channel exercising a throttling action increases.

It is especially expedient and advantageous in that case if the length of the ridges amounts to at least ⅓ of half the diameter of the backup or load application face extending in direction of the ridge. Beginning with this minimum length of the ridges, the flow restriction channels have a length which yields usable results in a plurality of application cases.

It is also especially expedient and advantageous if the liquid is silicone oil. The silicone oil is not toxic and can be used within a wide temperature range of $-70°$ to $+200°$. The dimensioning of the energy absorption is simplified if silicone oil is used.

If the damping device provided with the ridges in the invention is subjected to a directed shock force, the following sequence occurs:

Pressure is built up in the liquid, whereby there occurs an acceleration of the fluid outward and a flow through the ridge structure.

At the same time there occurs a deformation of the ridge structure due to the external load, for instance there occurs a curvature or camber of the external ridge crests; the flow-through passages grow evermore narrow with increasing load, a flow restriction effect is present and there results a pressure buildup with an exponentially increased energy consumption.

At the termination of the load application most of the liquid collects at the outer side of the basic body; the diaphragm is extended. During the ensuing load decay the ridge structure immediately rights itself; this and the force of the extended diaphragm return the liquid concurrently with the load decay into the cavity.

The damping device in the invention can, especially if it includes the ridges, be utilized to particular advantage in the lower portion, especially the heel region, of a shoe. The damping arrangement improves the wearing comfort of the shoe with simple means.

Figure 4:
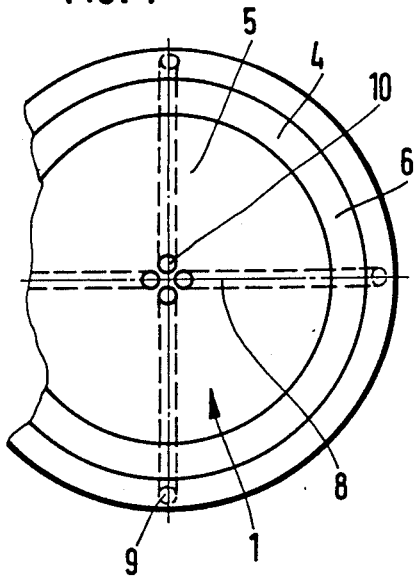
Figure 2:
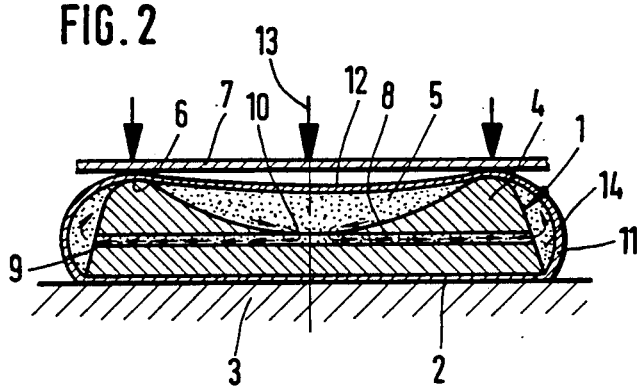
Figure 3:
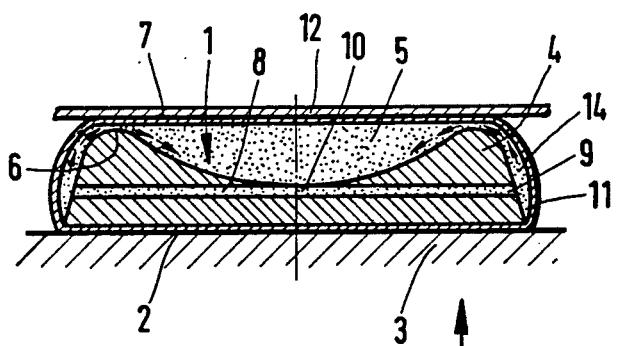
Figure 5:
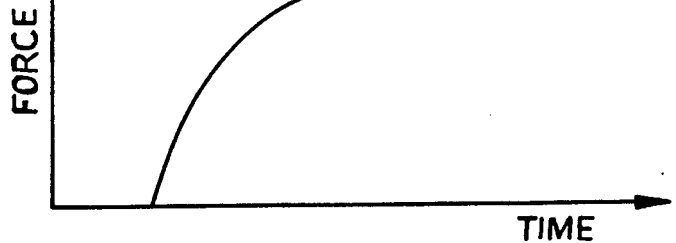
Figure 10:
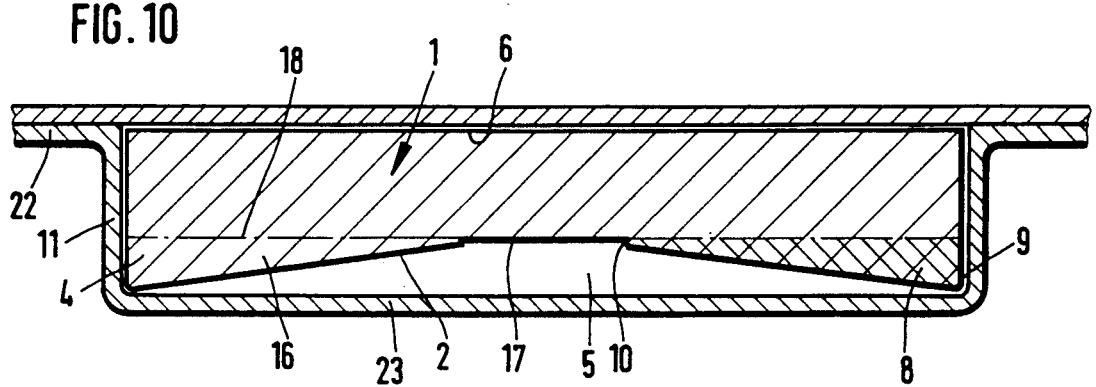
Figure 11:
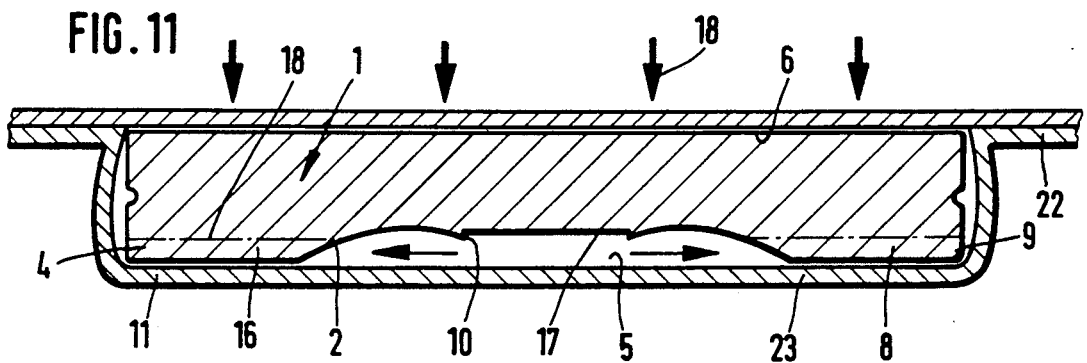
Figure 12:
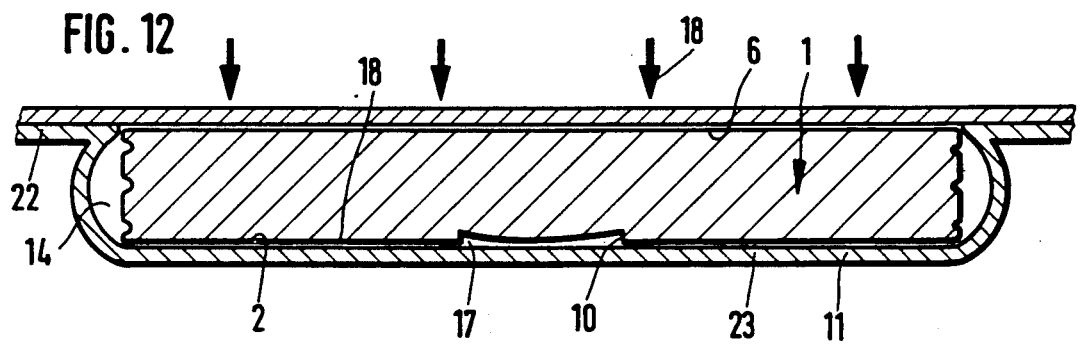
Figure 13:
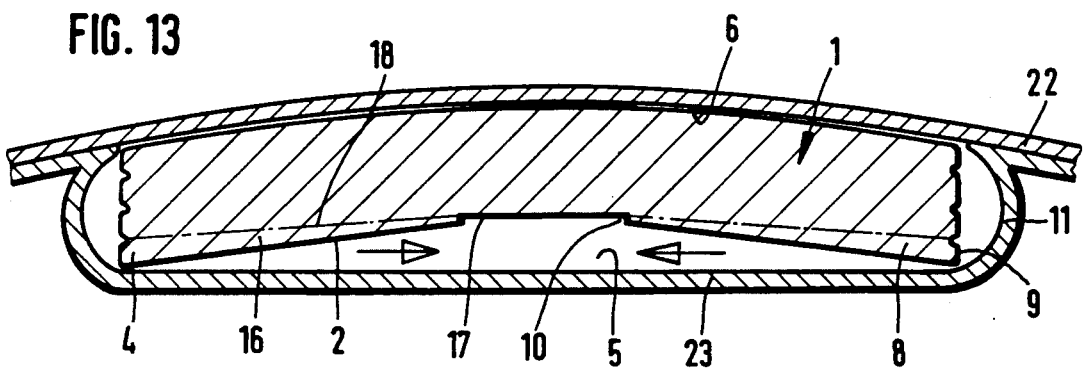
Figure 14:
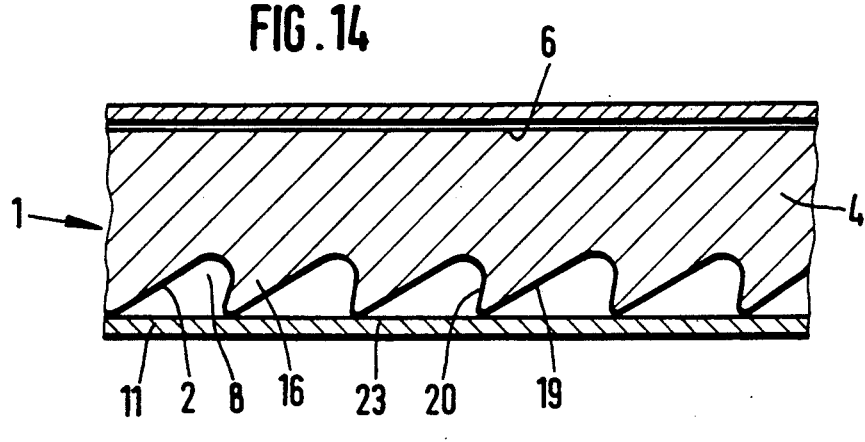
Figure 15:
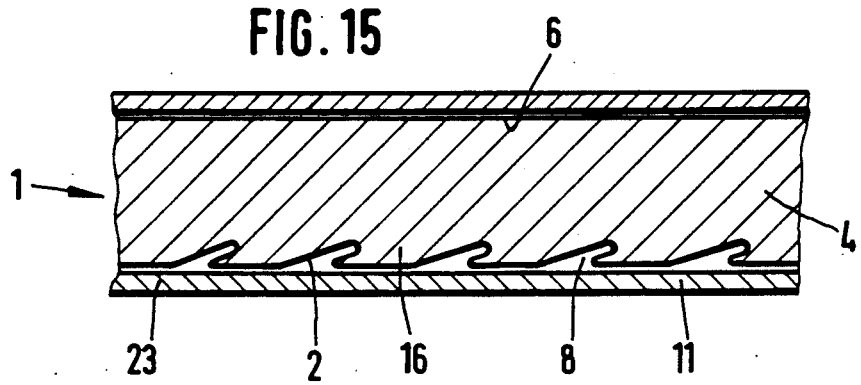
Figure 16:
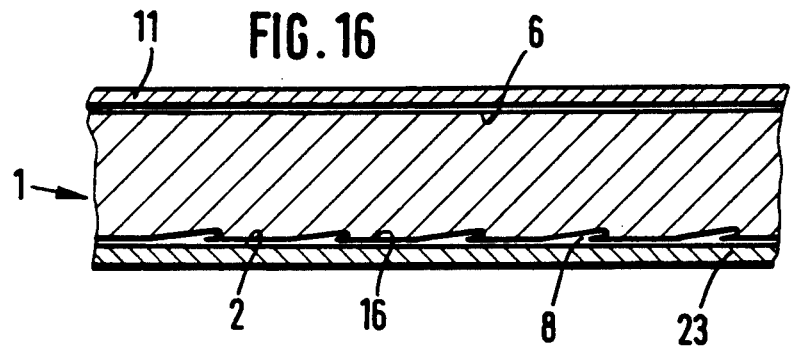

Preferred embodiment forms of the invention are depicted in the drawing; it shown on:

FIG. 1 a section through a damping device for shock loads in the unloaded state, FIG. 2 the damping device in FIG. 1 under shock loading, FIG. 3 the damping device in FIG. 1 after termination of the shock loading, FIG. 4 a plan view upon a damping device along the line IV—IV in FIG. 1, FIG. 5 the time-dependent force buildup at a backup face of a damping device with the load face subjected to shock load, FIG. 6 a section of an additional damping device for shock loads in the unloaded state, FIG. 7 the damping device in FIG. 6 under shock loading, FIG. 8 a section along the line VIII—VIII in FIG. 6, FIG. 9 a section along the line IX—IX in FIG. 7, FIGS. 10, 11, 12 and 13 a cross-section of a third damping device for shock loads and indeed respectively at different states of the load application and load decay, and FIGS. 14, 15 and 16 a cutout of a damping device in FIG. 10 respectively at different states of loading of the ridges.

The damping device in FIGS. 1-4 comprises a one-piece basic body 1, which has a circular periphery and forms a flat backup face 2 towards one side, which rests upon a foundation 3. The basic body 1 forms a bead or torus 4 closed in itself on the side lying opposite the backup face 2, which torus encloses a cavity-shaped chamber 5. The bead or torus 4 of the basic body 1 forms on the side lying opposite the backup face 2 an angularly-shaped load application face 6, upon which acts a load transmission part 7. Four straight, radially extending, elongated, closed all around flow restriction channels 8 are buried in the basic body, which each form respectively one external outlet 9 at the outer end edge of the basic body and whose inside outlet 10 is located in the central bottom region of the cavity-shaped chamber 5. A diaphragm 11 is provided which is fastened at the backup face 2 and indeed at its edge region in a liquid-tight manner. The diaphragm 11 extends over the outer end edge of the basic body 1 and the external outlets provided therein and lies loosely on the end edge. The diaphragm is somewhat stretched according to FIG. 1 and seals the outer outlets 9, 10, so that by itself no liquid can arrive from the cavity at the outer end edge of the basic body 1.

The diaphragm 11 extends then with loose contact up to the crest of the torus and covers thereupon the chamber 5 with its region 12. The chamber 5 and the flow restriction channels 8 are filled with a liquid, for instance water, If the load transmission part 7 acts in a blow-like or shock-like manner upon the damping device according to the arrows 13, then the basic body 1 is compressed in itself with material compression and the volume of the chamber 5 is reduced. Liquid exits from the external outlet 9, so that the diaphragm 11 extends into a circumferential bulge according to FIG. 2. If the load release from the shock occurs according to FIG. 3, the liquid does not need to flow back into the chamber 5 through the narrow flow restriction channels 8, rather it splashes over the torus or bead 4 back into the chamber, wherein the diaphragm 11 is somewhat lifted off the torus or bead.

FIG. 5 shows the force as a function of time measured at the backup face 2 and caused by the shock loading in direction of the arrows 13. The shock loading is transmitted in a damped manner, meaning it arrives at the backup face 2 without high initial peaks and rises steadily toward the maximum.

The statements pertaining to FIGS. 1 to 4 apply largely also to FIGS. 6 to 9, provided that nothing contrary is mentioned in the following.

According to FIGS. 6 to 9 the basic body 1 is cylindrically elongated and has walls 15 at its ends. The backup face 2 is a small strip in the unloaded state according to FIG. 8. The chamber 5 is cylindrically elongated and contains no items as was also the case in FIGS. 1 to 4. The load application face is also a small strip in the unloaded state according to FIG. 8. Two oppositely located rows of short flow restriction channels 8 are provided The diaphragm 11 embraces the entire basic body 1 and is fastened at its two end pieces and lies loosely on the basic body in the region of the flow restriction channels 8. Under loading a bulge 14 is produced at both sides of the basic body along the flow restriction channel rows, from which bulge the liquid flows back into the chamber 5 through the flow restriction channels 8. According to FIG. 9 the basic body is only deformed in its outer shape without material compression when subjected to shock loading 9.

The damping device discussed herein is used for instance in the head rest of a seat of a vehicle. The head rest is arranged above the seat back and supports the rear portion of the head of the person sitting on the seat in case of whiplash. In case of this whiplash the damping achievable by the damping device discussed above is very desirable.

The damping device in FIGS. 10–16 comprises a one-piece basic body 1, having a circular periphery and forming an uneven support or backup face 2 towards one side which rests upon a foundation not shown here. In the region of the support or backup face the basic body 1 forms an interrupted circumferential torus 4, which surrounds a cavity-shaped chamber 5. The torus 4 is formed by radially extending ridges 16, which reserve a side space 17 at the center and whose height increases continuously relative to a flat trunk face 18 from the inside towards the external edge of the basic body 1. A flat load application face 6 is provided on the side of the basic body 1 opposite to the support face 2, upon which a load transmitting part not shown here can act along the arrows 18. A plurality of straight, radially extending, elongated, open on one side flow restriction channels 8 are provided at the surface of the basic body 1, which each form respectively an external outlet 9 at the outer front edge of the basic body and whose inner outlet 10 is located in the central region of the cavity-shaped chamber 5 at its base near the side space 17. A diaphragm 11 is provided, which is fastened liquid-tight with area contact at the load application surface 6. The diaphragm 11 extends across the outer end edge of the basic body 1 and the outer outlet 9 provided therein and lies loosely on the end edge. The diaphragm 11 is somewhat loose according to FIG. 10 and comprises some play with respect to the end side of the basic body as well as having clearance or play with respect to the crest of the torus 4.

The flow restriction channels 8 are respectively bounded on the sides by one each ridge 16, whose cross-section can be discerned from FIG. 14. Since the ridges 16 extend radially, their circumferential cross-sectional dimension increases from the inside towards the outer edge of the basic body 1. The cross-section of each ridge 16 diminishes according to FIG. 10 towards its free end or crest. The reduction is relatively pronounced and angular according to FIG. 10. A rounded off or trapeze-like diminishing cross-section is also possible. Each ridge 16 forms a shallowly inclined flank 19 and a flank 20 with steep inclination.

The diaphragm 11 extends at the end edge of the basic body not only with loose contact, but rather loosely, with clearance 21 up to the crest of the torus or bead 4 and covers then the chamber 5 with its region 12. The chamber 5, the flow restriction channels 8 and the clearance space 21 are filled with a liquid, for instance silicone oil. If the load transmission parts act in the direction of the arrows 18 on the damping device according to FIG. 10 in a blow-like or shock-like manner, then the basic body 1 is pressed together including its ridges 16 involving material compression, wherein the ridges are then deformed according to FIG. 15 and 16. The volume of the chamber 5 is reduced and the flow restriction channels 8 are closed off and narrowed in cross-section migrating radially inward from the outer edge of the basic body 1. Liquid escapes at the external outlet 9, so that the diaphragm 11 extends in radial direction into a circumferential bulge 14 according to FIG. 12. If relief from the shock occurs according to FIG. 13, the liquid flows back through the flow restriction channels 8, which have very rapidly assumed their entire if only narrow cross-sections with erection of the ridges 16.

According to FIGS. 10 to 13 the diaphragm 11 is composed of a disk-shaped portion and a bowl-shaped portion, which are welded with each other so as to provide a seal along a circumferential edge region 22. According to FIGS. 10 to 13 a covering formation 23 covering the channels 8 is constituted by a portion of the diaphragm. It is conceivable to place two or more basic bodies in such a way upon each other into a common embracing diaphragm, that the ridges of the one basic body come to rest at the flat load application face of the adjacent basic body, wherein this load application face represents the covering formation.

I claim:

1. In an energy-absorbing damping device for shock loading, the device including a basic body of elastically deformable and elastically compressible material, the basic body defining a chamber filled with liquid, the basic member further defining valve-free narrow flow restriction channels in communication with the chamber, the basic body having an outer side, the flow restriction channels having an external outlet each at the outer side of the basic body, the external outlets being covered by an elastically extensible diaphragm which yields elastically when subjected to liquid pressure, the diaphragm being circumferentially sealingly mounted on the outer side of the basic body and being mounted partially loosely from the basic body, the basic body forming a torus with an apex surrounding the chamber, the chamber having the shape of a trough-like cavity, a covering formation extending across the cavity, the basic body having a support face and a load application face which are located opposite each other and extend essentially in the direction of the flow restriction channels, the improvement comprising the flow restriction channels extending radially, one of the support face and the load application face being at the apex of the torus of the basic body, the covering formation being formed by the diaphragm and being mounted on the apex of the torus, the basic body defining the trough-like cavity, the other of the support face and the load application face being plane, wherein the diaphragm is loosely mounted up to the apex of the torus, wherein the flow restriction channels are provided at one of the load application and support face of the basic body forming the cavity so as to be open on one side and are covered by the covering formation, and wherein the flow restriction channels are bounded on the side by ridges (16) formed by the basic body.

2. The damping device according to claim 1, wherein the ridges formed by the basic body taper toward their free ends.

3. The damping device according to claim 2, wherein the ridges whose cross-section tapers towards the free end each have a ridge flank with a shallower incline than the other flank.

4. The damping device according to claim 1, wherein the basic body, the flow restriction channels and the diaphragm are tuned to a damping sequence similar to a parabola.

5. The damping device according to claim 1, wherein the ridges are located at an essentially flat trunk surface of the basic body and the height of the ridges pointing away from the trunk surface increases in direction of the outer edge of the trunk surface thus with formation of the cavity.

6. The damping device according to claim 1, wherein the length of the ridges amounts to $\frac{1}{3}$ of half the diameter of the one of the support and load application face extending in direction of the ridge.

7. The damping device according to claim 1, wherein the liquid is silicone oil.

8. The damping device according to claim 1, mounted in the lower portion, especially the heel region of a shoe.

* * * * *

UNITED STATES PATENT AND TRADEMARK OFFICE
CERTIFICATE OF CORRECTION

PATENT NO. : 5,054,753

DATED : October 8, 1991

INVENTOR(S) : Michael Polus

It is certified that error appears in the above-identified patent and that said Letters Patent is hereby corrected as shown below:

On the title page, Item [30] Foreign Application Priority Data
March 1, 1989 [DE] Fed. Rep. of Germany....39 06 466
May 13, 1988 [DE] Fed. Rep. of Germany....38 16 400

Signed and Sealed this

First Day of June, 1993

Attest:

MICHAEL K. KIRK

Attesting Officer

Acting Commissioner of Patents and Trademarks